United States Patent
Patel et al.

(10) Patent No.: US 11,531,735 B1
(45) Date of Patent: Dec. 20, 2022

(54) DYNAMIC FRAUD INTERVENTION MACHINE

(71) Applicant: Callsign Ltd., London (GB)

(72) Inventors: Yogesh Kumar Jitendra Patel, London (GB); Stuart Dobbie, Fetcham (GB)

(73) Assignee: Callsign Ltd., London (GB)

( * ) Notice: Subject to any disclaimer, the term of this patent is extended or adjusted under 35 U.S.C. 154(b) by 0 days.

(21) Appl. No.: 17/572,377

(22) Filed: Jan. 10, 2022

(51) Int. Cl.
*G06F 21/00* (2013.01)
*G06F 21/31* (2013.01)

(52) U.S. Cl.
CPC .................... *G06F 21/316* (2013.01)

(58) Field of Classification Search
CPC ........................................ G06F 21/316
See application file for complete search history.

(56) References Cited

U.S. PATENT DOCUMENTS

| | | | | |
|---|---|---|---|---|
| 7,222,360 B1* | 5/2007 | Miller | | H04L 63/162 |
| | | | | 709/225 |
| 2008/0209223 A1* | 8/2008 | Nandy | | G06F 21/36 |
| | | | | 713/185 |
| 2009/0258667 A1* | 10/2009 | Suzuki | | G06F 21/32 |
| | | | | 340/5.53 |
| 2013/0091561 A1* | 4/2013 | Bruso | | G06F 21/31 |
| | | | | 726/16 |
| 2013/0226800 A1* | 8/2013 | Patel | | H04W 4/02 |
| | | | | 705/44 |
| 2018/0293393 A1* | 10/2018 | Effendi | | G06F 21/32 |
| 2019/0243955 A1* | 8/2019 | Rome | | G06F 21/46 |
| 2020/0004949 A1* | 1/2020 | Tyers | | G06F 21/316 |
| 2020/0053558 A1* | 2/2020 | Hallock | | H04L 63/0861 |
| 2020/0380112 A1* | 12/2020 | Allen | | G06F 21/44 |

* cited by examiner

*Primary Examiner* — Brandon Hoffman
*Assistant Examiner* — William A Corum, Jr.
(74) *Attorney, Agent, or Firm* — Schwegman Lundberg & Woessner, P.A.

(57) ABSTRACT

A machine detects a request to execute a transaction specified by a first set of user inputs. The machine determines, based on the first set of user inputs that specified the transaction, that the request to execute the transaction is to be verified with a corresponding challenge prompt that is to be generated for the request to execute the transaction. The machine then generates the challenge prompt that corresponds to the request to execute the transaction specified by the first set of user inputs that specified the transaction, and the machine causes presentation of the generated challenge prompt that corresponds to the request to execute the transaction. In response to the presented challenge prompt, the machine may receive a second set of user inputs. Based on the second set of user inputs, the machine then generates an indication of whether the request is verified.

19 Claims, 7 Drawing Sheets

DYNAMIC FRAUD INTERVENTION MACHINE

TECHNICAL FIELD

The subject matter disclosed herein generally relates to the technical field of special-purpose machines that facilitate detection of potential fraud and validation of requests, including software-configured computerized variants of such special-purpose machines and improvements to such variants, and to the technologies by which such special-purpose machines become improved compared to other special-purpose machines that facilitate detection of potential fraud and validation of requests. Specifically, the present disclosure addresses systems and methods to facilitate dynamic intervention in cases of potential fraud.

BACKGROUND

A machine may be configured to interact with a user by responding to a request for something (e.g., execution of a transaction). The machine may determine that the request is authentic or otherwise verified and consequently that the request should be fulfilled (e.g., the requested transaction should be executed), or the machine may determine that the request in not authentic or otherwise not verified and consequently that the request should be denied and not fulfilled (e.g., the requested transaction should not be executed).

BRIEF DESCRIPTION OF THE DRAWINGS

Some embodiments are illustrated by way of example and not limitation in the figures of the accompanying drawings.

DETAILED DESCRIPTION

Figure 1:
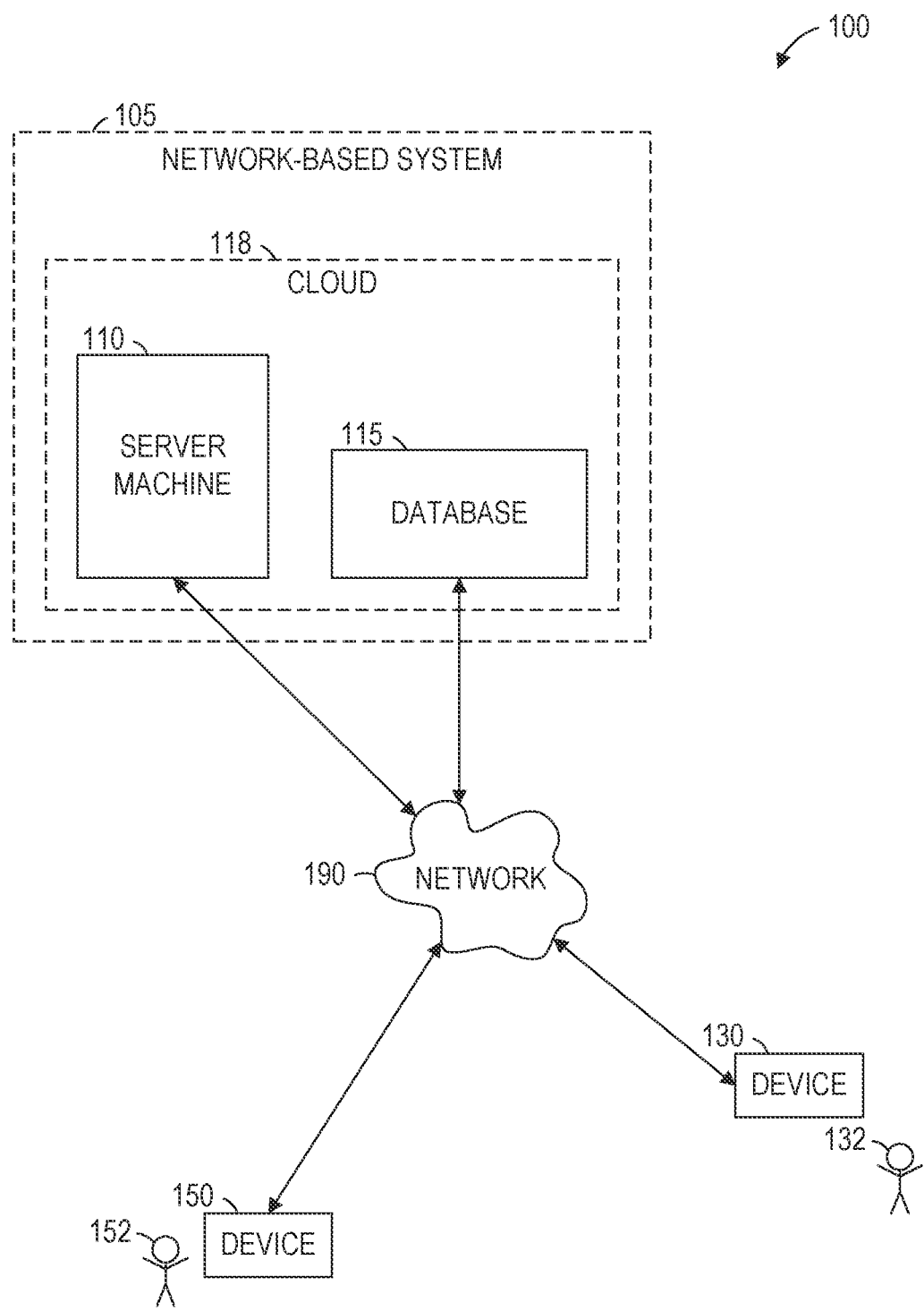
FIG. 1 is a network diagram illustrating a network environment suitable for dynamic intervention in cases of potential fraud, according to some example embodiments.

Example methods (e.g., algorithms) facilitate dynamic intervention in cases of potential fraud, and example systems (e.g., special-purpose machines configured by special-purpose software) are configured to facilitate dynamic intervention in cases of potential fraud. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

Various forms of application push payment fraud are an ever present and growing problem faced by enterprise organizations whose profit lines and reputation are impacted by social engineering fraud cases. The systems and methods discussed herein provide improved detection and countermeasure techniques to reduce the impact of social engineering fraud while retaining a positive customer experience and preserving the ultimate sovereignty of the user (e.g., a customer). As this is a dynamic landscape, a dynamic technique is helpful to protect users (e.g., customers). Commonly, users may be operating in a form of autopilot when in a panic situation or when under the pretense of trust, and accordingly static text or passive popup messages seldom stop the user from proceeding further. The systems and methods discussed herein facilitate jolting an at-risk user out of autopilot, such that the user can make informed decisions on what the user is doing.

A machine (e.g., specially configured by suitable software) detects a request to execute a transaction specified by a first set of user inputs. The request may by detected by receiving the request from a device that generated or conveyed the first set of user inputs. The machine determines, based on the first set of user inputs that specified the transaction, that the request to execute the transaction is to be verified (e.g., additionally verified in contrast with one or more other requests) with a corresponding challenge prompt that is to be generated for the request to execute the transaction. The machine then generates the challenge prompt that corresponds to the request to execute the transaction specified by the first set of user inputs that specified the transaction, and the machine causes presentation of the generated challenge prompt that corresponds to the request to execute the transaction. In response to the presented challenge prompt, a second set of user inputs is received (e.g., by the machine). Based on the second set of user inputs received in response to the presentation of the generated challenge prompt, the machine then generates an indication of whether the request to execute the transaction is verified.

According to the methods discussed herein, the machine is configured to verify that a user's remote transaction request is genuine, valid, or both, by requesting and analyzing the user's responses to one or more dynamic intervention prompts. As used herein, a "remote transaction request" may be or include one or more of the following remote online transactions: a login request, a credential amendment request, a request to execute a monetary transaction, a request to amend a previous monetary transaction request, or any suitable combination thereof. Furthermore, the content of a dynamic intervention prompt can (e.g., in and of themselves) be selected or generated for inclusion in the dynamic intervention prompt, based on contextual information that attempts to perform one or more of the following effects: invoke user awareness, invoke clarity in the user of his or her current interaction, and provoke a response that can be measured for anomaly, validity, or both. Potentially beneficial aspects of the methods and systems discussed herein include detecting one or more pre-intervention signals (e.g., a combination of multiple pre-intervention signals) to identify a user as a candidate for intervention, producing one or more dynamic intervention contextual prompts (e.g., a series of challenge prompts) based upon one or more pre-intervention signals, transactional information, or both, and analyzing behavioral input signals (e.g., in a response) when the user responds to the one or more dynamic intervention prompts for the presence of one or more behavioral characteristics indicative of social engineering.

Additional details of various optional techniques may be implemented by one or more example embodiments of the systems and methods discussed herein. A machine configured to perform behavioral analysis analyzes one or more of the pre-intervention input signals and uses the resulting analysis as a basis for selecting or generating content to be included in a challenge prompt. For example, the machine may detect and analyze any number of pre-intervention signals generated by a user in submitting behavioral signals via a keyboard, a touch pad (e.g., a touchscreen), a mouse, a stylus, a headset, a game controller, any other type of input device, or any suitable combination thereof. Such pre-intervention signals may be or include a series of user-generated inputs (e.g., up to or including a request to do something, such as a request to execute a transaction), and the machine may be trained to classify the presence of stress, duress, coercion, coaching, or any suitable combination thereof, based on an analysis of the series of user-generated inputs.

In some example embodiments, the machine selects or generates a user interface (e.g., a graphical user interface, including its content, such as layout, colors, fonts, input elements, or other elements of its visual representation) to convey a challenge prompt (e.g., a dynamic challenge prompt) or otherwise effect a dynamic intervention for potential fraud. As one example, the machine may select or generate graphical content (e.g., one or more GUI elements) that is primed (e.g., via an algorithmic function) to invoke a specific behavioral response from the user. As another example, the machine may select or generate message content (e.g., one or more text phrases or sentences with specific grammatical structure, length, numerical characters, special characters, or any suitable combination thereof) that is primed (e.g., via an algorithmic function) to invoke a specific behavioral response.

In such examples of priming the content of the challenge prompt, the machine may evaluate the response for indications of one or more behavioral characteristics (e.g., stress, duress, coercion, coaching, or any suitable combination thereof). For example, in situations where the challenge prompt is primed to invoke a specific behavioral response, the machine may evaluate the actually received response against one or more behavioral characteristics of the user observed (e.g., monitored) in one or more previous genuine interactions (e.g., where a user's prior typing pattern is used to introduce a bias into a text typing challenge generated for the user and requested to be typed by the user). As another example, in situations where the challenge prompt is primed to invoke a specific knowledge response, the machine may evaluate the actually received response against the transactional knowledge of the user (e.g., where one or more details of a user's prior transaction is used to introduce a bias into a text typing challenge generated for the user and requested to be typed by the user). Further details of one or more example embodiments are discussed below.

FIG. 1 is a network diagram illustrating a network environment 100 suitable for dynamic intervention in cases of potential fraud, according to some example embodiments. The network environment 100 includes a server machine 110, a database 115, and devices 130 and 150, all communicatively coupled to each other via a network 190. The server machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). The server machine 110, the database 115, and the devices 130 and 150 may each be implemented in a special-purpose (e.g., specialized) computer system, in whole or in part, as described below with respect to FIG. 7. Any one or more of the methods discussed herein may be fully or partly performed by (e.g., executed on) the server machine 110, the databases 115, the device 130, the device 150, or any suitable combination thereof.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 7, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured in any of various ways, for example, as a text file, a table, a spreadsheet, a relational database (e.g., an object-relational database), a triple store, a hierarchical data store, a document database, a graph database, key-value pairs, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
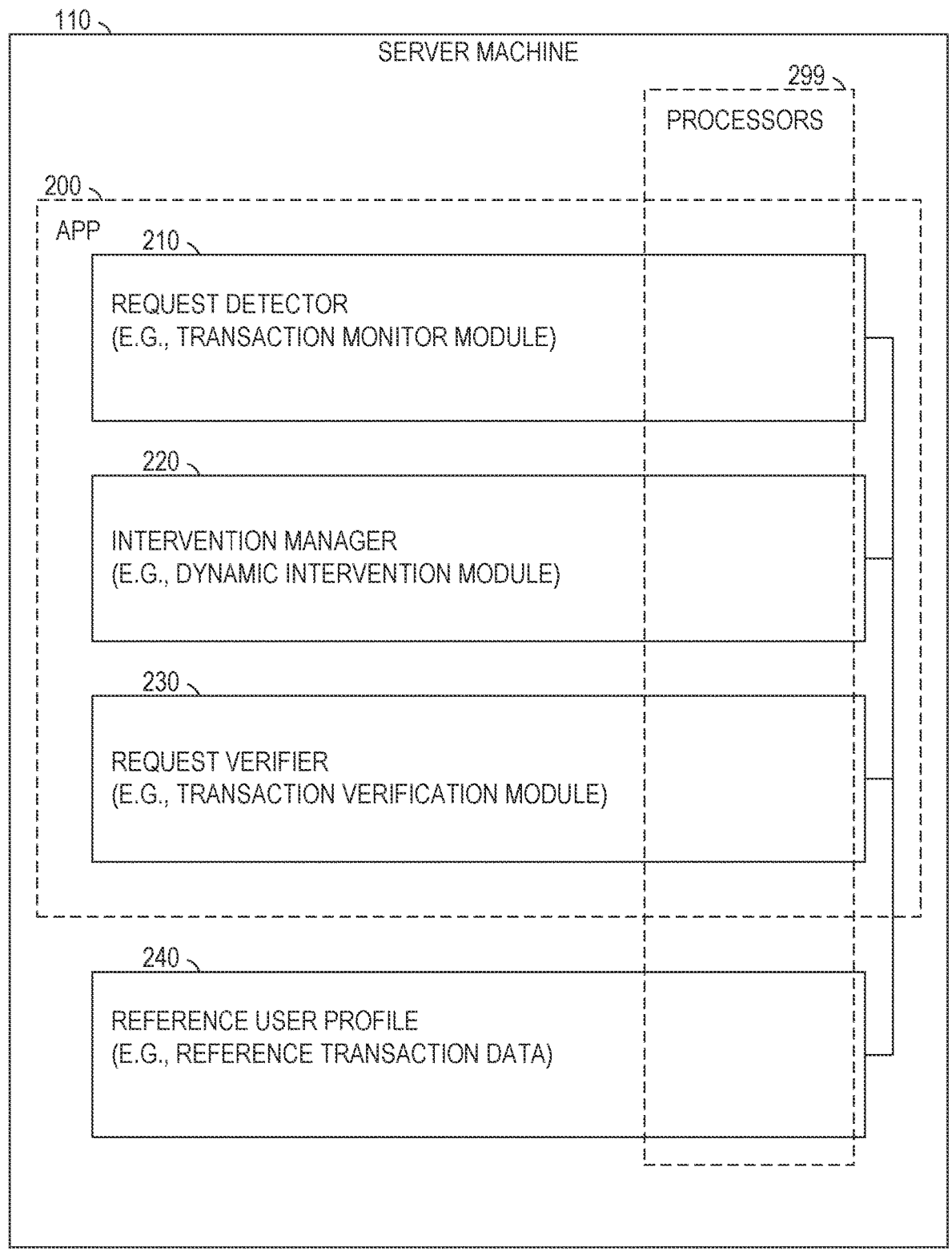
FIG. 2 is a block diagram illustrating components of a server machine suitable for dynamic intervention in cases of potential fraud, according to some example embodiments.

FIG. 2 is a block diagram illustrating components of the server machine 110, according to some example embodiments. The server machine 110 is shown as including a request detector 210 (e.g., a transaction monitor module or similarly suitable code for monitoring requests for transactions), an intervention manager 220 (e.g., a dynamic intervention module or similarly suitable code for providing dynamic interventions in processing requests for transactions), a request verifier 230 (e.g., a transaction verification module or similarly suitable code for verifying requests for transactions), and a reference user profile 240 (e.g., containing data indicating one or more reference transactions requested by a corresponding user, such as the user 132), all configured to communicate with each other (e.g., via a bus, shared memory, or a switch).

As shown in FIG. 2, the request detector 210, the intervention manager 220, the request verifier 230, or any suitable combination thereof, may form all or part of an app 200 (e.g., a server-side app) that is stored (e.g., installed) on the server machine 110 (e.g., responsive to or otherwise as a result of data being received from the database 115 or otherwise via the network 190). Furthermore, one or more processors 299 (e.g., hardware processors, digital processors, or any suitable combination thereof) may be included (e.g., temporarily or permanently) in the app 200, the request detector 210, the intervention manager 220, the request verifier 230, or any suitable combination thereof. In some example embodiments, the reference user profile 240 is fully or partly stored by the database 115.

The request detector 210 is configured (e.g., by suitable hardware, software, or both) to detect one or more pre-intervention signals generated by the user 132 of the device 130 (e.g., any number of pre-intervention signals generated by the user 132 in submitting user-generated input via a keyboard, a touch pad, a mouse, a stylus, a headset, a game controller, any other type of input device, or any suitable combination thereof), and such one or more pre-intervention signals (e.g., a series of pre-intervention user inputs) may include a user-generated request to do something (e.g., a request to execute a transaction).

Examples of such pre-intervention signals include: an open network port associated with a remote access tool; a geographical distance between a remote session and a client session; a pattern of user inputs corresponding to a type of transaction, a type of channel, or a type of engagement (e.g., a type of device); a behavioral signal indicative of an off-screen event; a completion time for keystroke input (e.g., start time, end time, duration, typing cadence, or any suitable combination thereof); a completion time for touch input (e.g., start time, end time, duration, tapping cadence, or any suitable combination thereof); a completion time for form entry input (e.g., entry field focus start time, entry field focus end time, entry cadence, or any suitable combination thereof); a calculated difference between a first keystroke and a last keystroke within a series of keystrokes; a delay time for entering a special character (e.g., a non-numeric, non-alphabetic text character); a presence or absence of geographical movement of the device 130 (e.g., immobility) during generation of user-generated input; an elapsed time spent interacting with a specific GUI (e.g., a webpage); an elapsed time spent in a specific networking session; a comparative analysis of user-generated input from a current networking session to user-generated input from a previous (e.g., authenticated or otherwise validated) networking session; a configuration (e.g., a profile) of one or more open networking ports; and a longitudinal analysis of any one or more of the above-listed pre-intervention signals.

The intervention manager 220 is configured (e.g., by suitable hardware, software, or both) to analyze the one or more pre-intervention signals detected by the request detector 210 and determine whether any one or more of the analyzed pre-intervention signals (e.g., a request to execute a transaction) is to be verified. The intervention manager 220 is also configured (e.g., by suitable hardware, software, or both) to select, generate, or otherwise provide one or more challenge prompts (e.g., including selection or generation of one or more pieces of content for inclusion in the one or more challenge prompts) for dynamically intervening in an ongoing interaction with the user 132, to check for potentially fraudulent activity. Accordingly, the intervention manager 220 may be configured to algorithmically select, generate, or otherwise provide behavior-priming content (e.g., graphical, textual, or both) tailored to trigger, induce, or otherwise invite exhibition of one or more behavioral characteristics of the user 132, and the selection, generation, or other provision of such behavior-priming content may be based on any one or more of the above-listed pre-intervention signals. Additionally, or alternatively, the intervention manager 220 may be configured to algorithmically select, generate, or otherwise provide knowledge content tailored to trigger, induce, or otherwise invite exhibition of one or more things known to the user 132, and the selection, generation, or other provision of such knowledge content may be based on any one or more of the above-listed pre-intervention signals.

The request verifier 230 is configured (e.g., by suitable hardware, software, or both) to analyze what the user 132 provides in response to the one or more challenge prompts provided by the intervention manager 220 and, based on that analysis, determine whether a user-generated request to do something (e.g., a request to execute a transaction, which may be among the one or more pre-intervention signals detected by the request detector 210) is authentic or otherwise verified (e.g., as being genuinely from the user 132, without stress, duress, coercion, coaching, or any combination thereof).

The reference user profile 240 stores one or more indicators of previous (e.g., historical and authenticated or otherwise validated) behavioral characteristics of the user 132. Examples of such indicators include indicators of any one or more of the pre-intervention signals discussed above.

Figure 3:
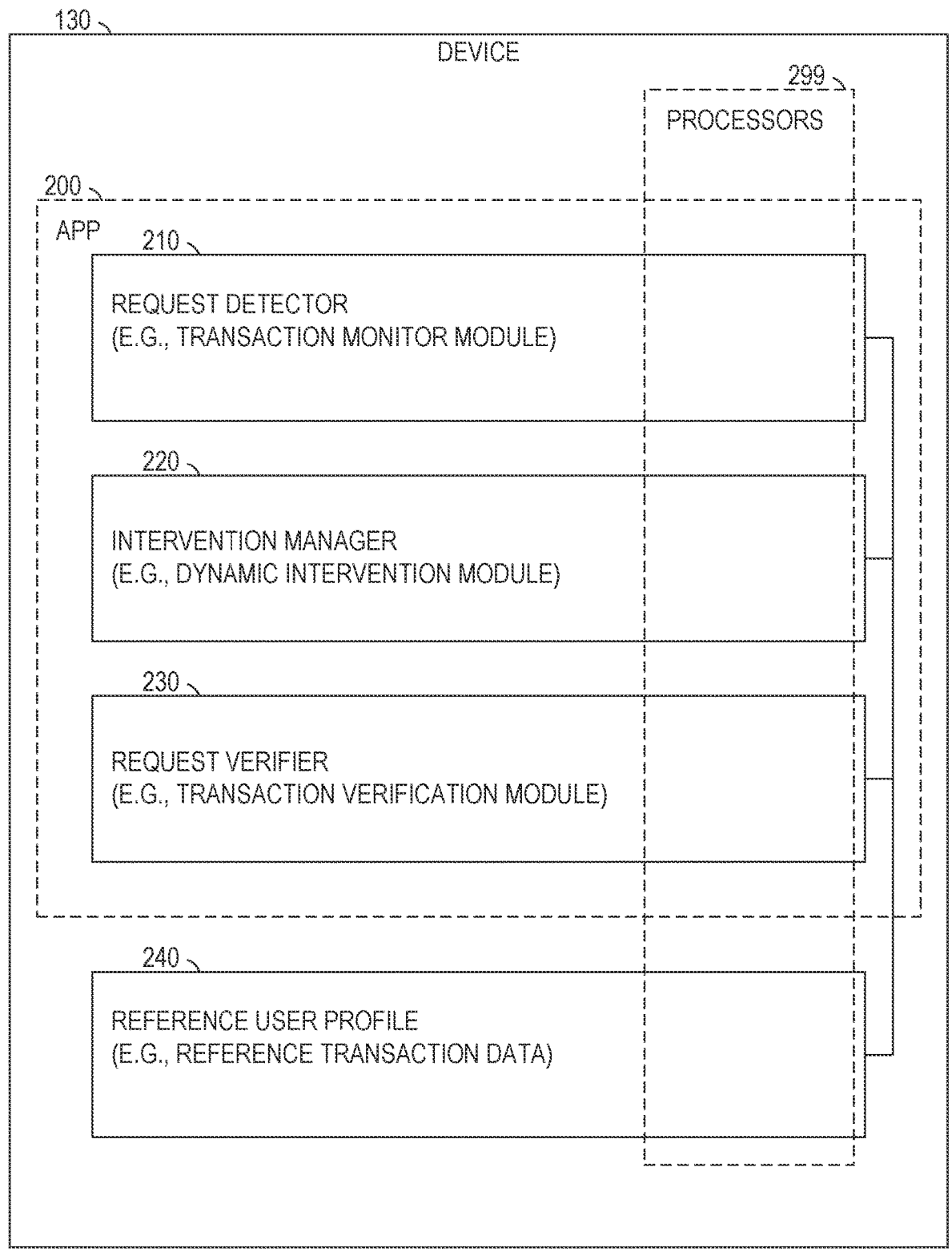
FIG. 3 is a block diagram illustrating components of a device suitable for dynamic intervention in cases of potential fraud, according to some example embodiments.

FIG. 3 is a block diagram illustrating components of the device 130, according to some example embodiments. The device 130 is shown as including the request detector 210 (e.g., a transaction monitor module or similarly suitable code for monitoring requests for transactions), the intervention manager 220 (e.g., a dynamic intervention module or similarly suitable code for providing dynamic interventions in processing requests for transactions), the request verifier 230 (e.g., a transaction verification module or similarly suitable code for verifying requests for transactions), and the reference user profile 240 (e.g., containing data indicating one or more reference transactions requested by a corresponding user, such as the user 132), all configured to communicate with each other (e.g., via a bus, shared memory, or a switch).

As shown in FIG. 3, the request detector 210, the intervention manager 220, the request verifier 230, or any suitable combination thereof, may form all or part of the app 200 (e.g., a mobile app, a client-side app, or both) that is stored (e.g., installed) on the device 130 (e.g., responsive to or otherwise as a result of data being received from the server machine 110, the database 115, or otherwise via the network 190). Furthermore, one or more processors 299 (e.g., hardware processors, digital processors, or any suitable combination thereof) may be included (e.g., temporarily or permanently) in the app 200, the request detector 210, the intervention manager 220, the request verifier 230, or any suitable combination thereof. As noted above, in some example embodiments, the reference user profile 240 is fully or partly stored by the database 115. The request detector 210, the intervention manager 220, the request verifier 230, and the reference user profile 240 may operate within the device 130 in manners similar to those described above for the request detector 210, the intervention manager 220, the request verifier 230, and the reference user profile 240 within the server machine 110 (e.g., as described above with respect to FIG. 2).

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 4:
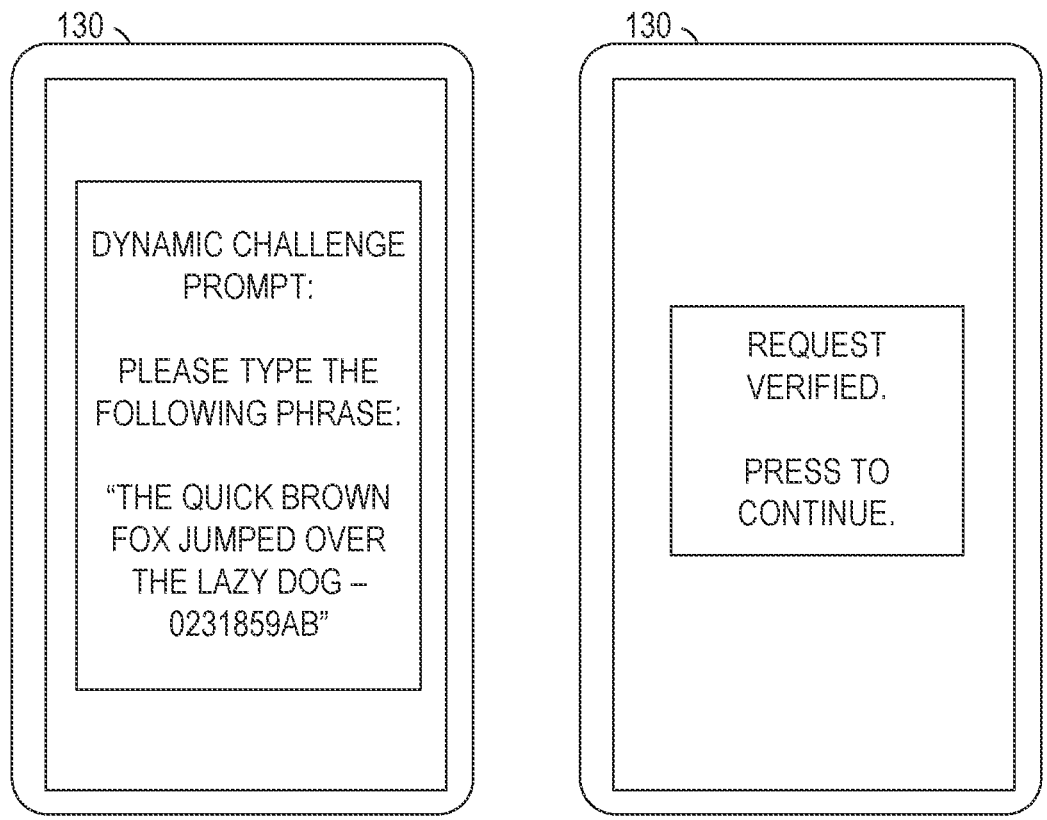
FIG. 4 is a block diagram illustrating a dynamic challenge prompt being presented by the device and a possible result from a user responding to the dynamic challenge prompt, according to some example embodiments.

FIG. 4 is a block diagram illustrating a dynamic challenge prompt being presented by the device 130 and a possible result from a user responding to the dynamic challenge prompt, according to some example embodiments. As shown on the left side of FIG. 4, the device 130 is presenting (e.g., displaying) the dynamic challenge prompt, which may have been generated by the intervention manager 220 (e.g., as described above with respect to FIGS. 2 and 3). As shown on the right side of FIG. 4, the device 130 is presenting an indication that a user-generated request to do something (e.g., a request to execute a transaction) has been deemed as being authentic or otherwise verified (e.g., determined by the request verifier 230 as being genuinely from the user 132, without stress, duress, coercion, coaching, or any combination thereof, as discussed above with respect to FIGS. 2 and 3).

Figure 5:
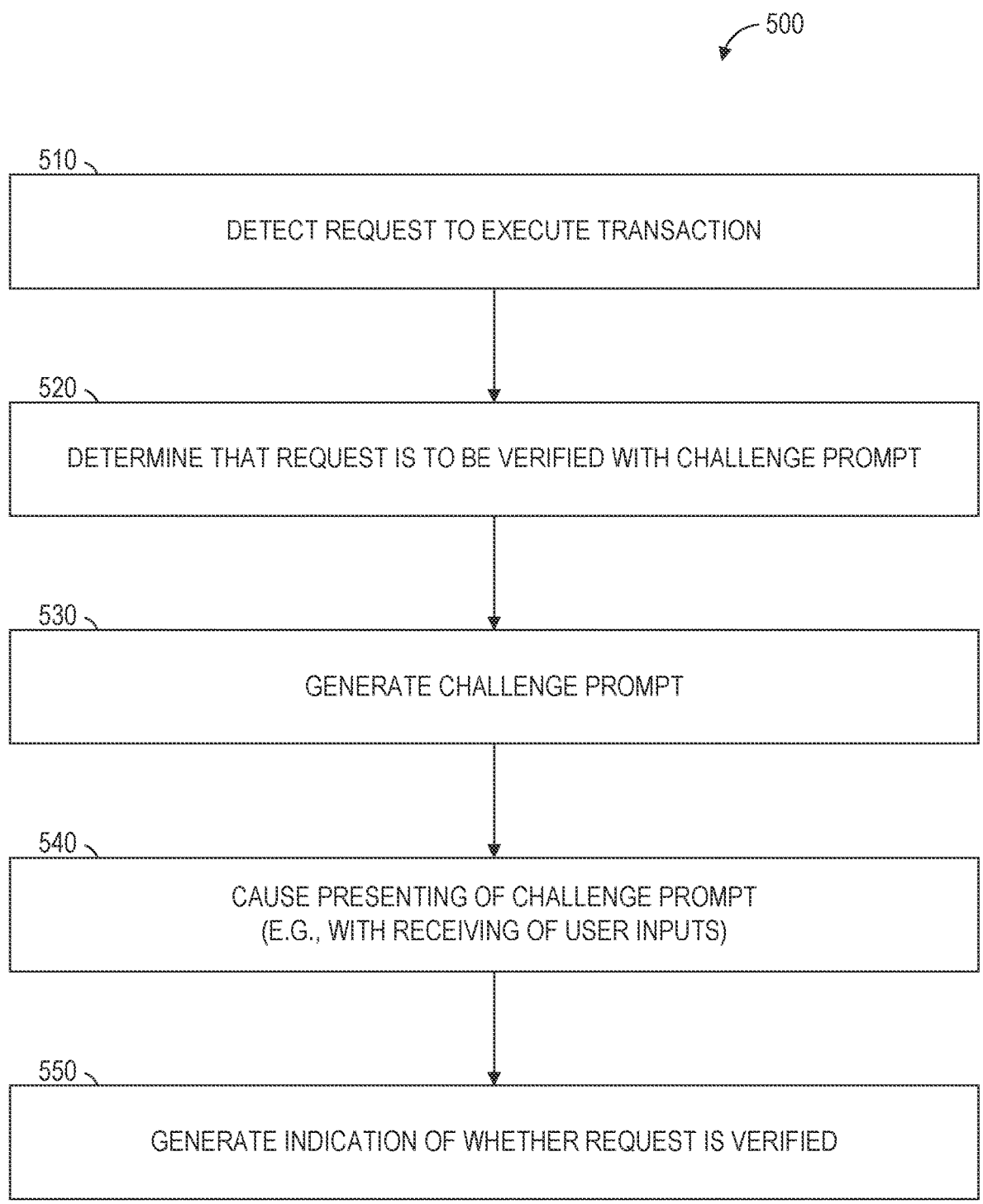
FIGS. 5 and 6 are flowcharts illustrating operations of a machine in performing a method of dynamic intervention in cases of potential fraud, according to some example embodiments.
Figure 6:
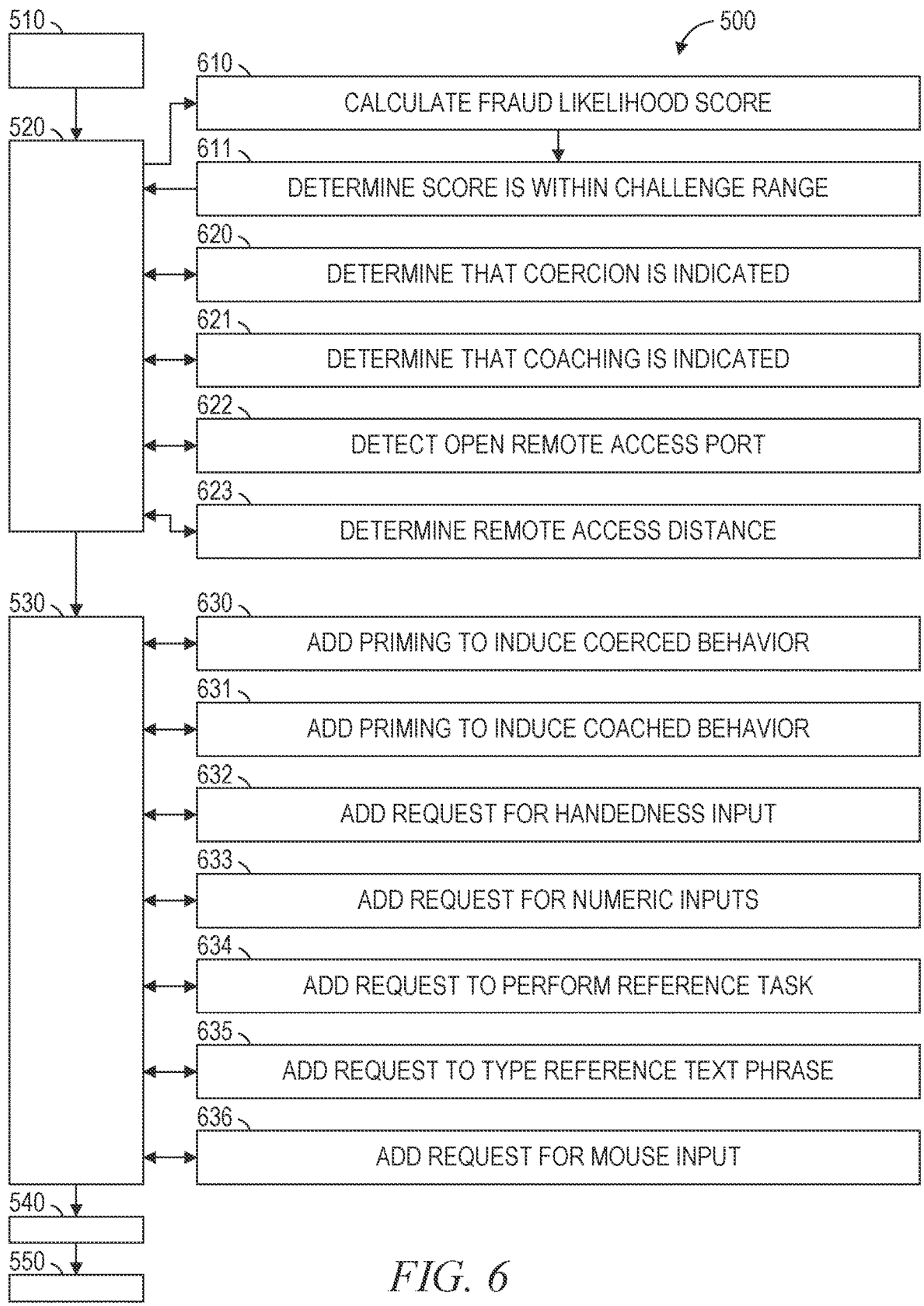

FIGS. 5 and 6 are flowcharts illustrating operations (e.g., of the server machine 110, the device 130, or both in combination) in performing a method 500 of dynamic intervention in cases of potential fraud, according to some example embodiments. Operations in the method 500 may be performed by the server machine 110, the device 130, or both together, using components (e.g., modules) described above with respect to FIGS. 2 and 3, using one or more processors (e.g., microprocessors or other hardware processors), or using any suitable combination thereof. As shown in FIG. 5, the method 500 includes operations 510, 520, 530, 540, and 550

In operation 510, the request detector 210 detects a request to execute a transaction specified by a first set of user inputs. The first set of user inputs may be or include a received or otherwise accessed series or other set of pre-intervention signals generated by the user 132. As noted above, according to various example embodiments, other types of requests (e.g., a request to do something, such as log in or update user information) may be detected by the request detector 210.

In operation 520, the intervention manager 220 determines, based on the first set of user inputs (e.g., that specified the transaction requested to be executed), that the request detected in operation 510 (e.g., to execute the transaction) is to be verified (e.g., dynamically) with a corresponding challenge prompt that is to be generated for that same request (e.g., to execute the transaction).

In operation 530, the intervention manager 220 generates the challenge prompt that corresponds to the request (e.g., to execute the transaction specified by the first set of user inputs that specified the transaction). As noted above, the generation of the challenge prompt may include selection or generation of one or more pieces of content (e.g., behavior priming content, knowledge content, or both) for inclusion in the challenge prompt to be generated.

In operation 540, the intervention manager 220 presents or otherwise causes presentation of the challenge prompt generated in operation 530. As noted above, the generated challenge prompt may correspond to the request (e.g., to execute the transaction). The caused presentation of the challenge prompt may request, trigger, induce, or otherwise invite generation and submission of a second set of user inputs, and the second set of user inputs may accordingly be received or otherwise accessed in response to the presentation of the generated challenge prompt.

,In operation 550, the request verifier 230 generates an indication of whether the request detected in operation 510 (e.g., a request to execute the transaction specified by the first set of user inputs) is verified. The generation of this indication may be based on the second set of user inputs received in response to the caused presentation of the challenge prompt generated in operation 530 (e.g., the challenge prompt that corresponds to the transaction specified by the first set of user inputs). In situations where the request verifier 230 analyzes the second set of user inputs and determines that the second set of user inputs is indicative of stress, duress, coercion, coaching, or any combination thereof, the generated indication may indicate that the request is not verified (e.g., not authentic), is potentially fraudulent (e.g., is potentially not genuine), or both. In situations where the request verifier 230 analyzes the second set of user inputs and determines that the second set of user inputs is not indicative of stress, duress, coercion, coaching, or any combination thereof, the generated indication may indicate that the request is verified (e.g., authentic), is unlikely to be fraudulent (e.g., is likely to be genuine), or both. The generated indication may then be presented or otherwise caused to be present (e.g., by the device 130, as discussed above with respect to FIG. 4).

As shown in FIG. 6, in addition to any one or more of the operations described above, the method 600 may include one or more of operations 610, 611, 620, 621, 622, 623, 630, 631, 632, 633, 634, 635, and 636. One or more of operations 610, 611, 620, 621, 622, or 623 may be performed as part (e.g., a precursor task, a subroutine, or a portion) of operation 520, in which the intervention manager 220 determines that the request detected in operation 510 is to be verified (e.g., dynamically) with a corresponding challenge prompt to be generated for that request.

In operation 610, as part of determining that the request is to be verified, the intervention manager 220 calculates a fraud likelihood score of the request based on the first set of user inputs, and then in operation 611, the intervention manager 220 determines that the fraud likelihood score of the request is within a first range of fraud likelihood scores, where the first range is between a second range of fraud likelihood scores and a third range of fraud likelihood scores. The second range may correspond to presence of fraud, and the third range may correspond to absence of fraud. In example embodiments that include operation 610, the determination that the request is to be verified (e.g., with the corresponding challenge prompt) may be based on the fraud likelihood score being within the first range that is between the second range and the third range.

In operation 620, as part of determining that the request is to be verified, the intervention manager 220 determines that the first set of user inputs indicate coercion (e.g., indicate that at least a threshold minimum level of coercion is likely present in the first set of user inputs) based on a comparison of the first set of user inputs to reference user inputs that indicate coercion. In example embodiments that include operation 620, the challenge prompt generated in operation 530 may include user priming content that is configured to trigger behavior that indicates coercion (e.g., that further indicates more coercion or further indicates a greater extent of coercion than indicated by the first set of user inputs), and in operation 550, the generating of the indication of whether the request is verified may be based on whether the behavior that indicates coercion is indicated by the second set of user inputs received in response to the generated challenge prompt.

In operation 621, as part of determining that the request is to be verified, the intervention manager 220 determines that the first set of user inputs indicate coaching (e.g., indicate that at least a threshold minimum level of coaching is likely present in the first set of user inputs) based on a comparison of the first set of user inputs to reference user inputs that indicate coaching. In example embodiments that include operation 621, the challenge prompt generated in operation 530 may include user priming content that is configured to trigger behavior that indicates coaching (e.g., that further indicates more coaching or further indicates a greater extent of coaching than indicated by the first set of user inputs), and in operation 550, the generating of the indication of whether the request is verified may be based on whether the behavior that indicates coaching is indicated by the second set of user inputs received in response to the generated challenge prompt.

In operation 622, as part of determining that the request is to be verified, the intervention manager 220 detects an open network port that corresponds to remote access software. In some example embodiments, the intervention manager 220 additionally, or alternatively, detects the presence of a configuration (e.g., a profile) of one or more open networking ports, and one or more of the open networking ports included in the detected configuration may correspond to remote access software.

In operation 623, as part of determining that the request is to be verified, the intervention manager 220 determines (e.g., calculates or otherwise obtains) a geographical distance between a remote access device that is communicating (e.g., via an open networking port, an open networking session, or both) with the device 130 (e.g., a client device) that submitted the request detected in operation 510 (e.g., the request to execute the transaction).

One or more of operations 630, 631, 632, 633, 634, 635, or 636 may be performed as part (e.g., a precursor task, a subroutine, or a portion) of operation 530, in which the intervention manager 220 generates the challenge prompt that corresponds to the request that was detected in operation 510.

In operation 630, as part of generating the challenge prompt, the intervention manager 220 adds user priming content to the challenge prompt being generated. The user priming content is configured to trigger behavior that indicates coercion (e.g., that further indicates more coercion or further indicates a greater extent of coercion than indicated by the first set of user inputs). The intervention manager 220 may first select, generate, or otherwise obtain such user priming content (e.g., from the server machine 110, the database 115, or both). In example embodiments that include operation 630, the generating of the indication in operation 550 may be based on whether the behavior that indicates coercion is indicated by the second set of user inputs received in response to the generated challenge prompt.

In operation 631, as part of generating the challenge prompt, the intervention manager 220 adds user priming content to the challenge prompt being generated. The user priming content is configured to trigger behavior that indicates coaching (e.g., that further indicates more coaching or further indicates a greater extent of coaching than indicated by the first set of user inputs). The intervention manager 220 may first select, generate, or otherwise obtain such user priming content (e.g., from the server machine 110, the database 115, or both) for inclusion in the challenge prompt. In example embodiments that include operation 630, the generating of the indication in operation 550 may be based on whether the behavior that indicates coaching is indicated by the second set of user inputs received in response to the generated challenge prompt.

In operation 632, the first set of user inputs that specified the transaction includes a detected combination of dominant hand inputs and subordinate hand inputs that indicates a detected handedness of the user 132 that submitted the first set of user inputs, and as part of generating the challenge prompt, the intervention manager 220 adds a request to the challenge prompt being generated. The detection of the combination of dominant hand inputs and subordinate hand inputs may have been previously performed by the request detector 210 (e.g., as part of performing operation 510). In example embodiments that include operation 632, the request that is being added to the challenge prompt requests submission (e.g., by the user 132 via the device 130) of a reference combination of dominant hand inputs and subordinate hand inputs that indicates a reference handedness of the user 132. The reference combination of dominant hand inputs and subordinate hand inputs may be indicated (e.g., stored, encoded, or otherwise represented) by the reference user profile 240. In example embodiments that include operation 632, the generating of the indication in operation 550 is based on whether the reference combination of dominant hand inputs and subordinate hand inputs is included in the second set of user inputs received in response to the generated challenge prompt.

In operation 633, the first set of user inputs that specified the transaction indicates a detected pattern of keyboard numeric inputs and keypad numeric inputs, and as part of generating the challenge prompt, the intervention manager 220 adds a request to the challenge prompt being generated. The detection of the pattern of keyboard numeric inputs and keypad numeric inputs may have been previously performed by the request detector 210 (e.g., as part of performing operation 510). In example embodiments that include operation 633, the request that is being added to the challenge prompt requests submission (e.g., by the user 132 via the device 130) of numeric inputs that indicate a reference pattern of keyboard numeric inputs and keypad numeric inputs. The reference pattern of keyboard numeric inputs and keypad numeric inputs may be indicated (e.g., stored, encoded, or otherwise represented) by the reference user profile 240. In example embodiments that include operation 633, the generating of the indication in operation 550 is based on whether the reference pattern of keyboard numeric inputs and keypad numeric inputs is present in the second set of user inputs received in response to the generated challenge prompt.

In operation 634, the first set of user inputs that specified the transaction indicates a detected completion time to perform a first task (e.g., among a set of tasks that may include a second task distinct from the first task), and as part of generating the challenge prompt, the intervention manager 220 adds a request to the challenge prompt being generated. The detection of the completion time to perform the first task may have been previously performed by the request detector 210 (e.g., as part of performing operation 510). In example embodiments that include operation 634, the request that is being added to the challenge prompt requests performance of a reference task. The reference task may be indicated (e.g., stored, encoded, or otherwise represented) by the reference user profile 240. In example embodiments that include operation 634, the generating of the indication in operation 550 is based on whether a reference completion time (e.g., indicated by the reference user profile 240) to perform the reference task is indicated as being exceeded by the second set of user inputs received in response to the generated challenge prompt.

In operation 635, the first set of user inputs that specified the transaction indicates a detected completion time to type a first text phrase (e.g., among a set of text phrases that may include a second text phrase distinct from the first text phrase), a detected combination of typing cadence and typing error rate in typing a first text phrase, or both. As part of generating the challenge prompt in operation 635, the intervention manager 220 adds a request to the challenge prompt being generated. The detection of the completion time to type the first text phrase, the combination of typing cadence and typing error rate, or both, may have been previously performed by the request detector 210 (e.g., as part of performing operation 510). In example embodiments that include operation 635, the request that is being added to the challenge prompt requests submission of a reference text phrase. The reference text phrase may be indicated (e.g., stored, encoded, or otherwise represented) by the reference user profile 240. In example embodiments that include operation 635, the generating of the indication in operation 550 is based on whether a reference completion time (e.g., indicated by the reference user profile 240) to type the reference text phrase is indicated as being exceeded by the second set of user inputs received in response to the generated challenge prompt, on whether a reference combination (e.g., indicated by the reference user profile 240) of typing cadence and typing error rate in typing the reference text phrase is indicated by the second set of user inputs received in response to the generated challenge prompt, or on both.

In operation 636, the first set of user inputs that specified the transaction indicates a detected pattern of mouse jitter, and as part of generating the challenge prompt, the intervention manager 220 adds a request to the challenge prompt being generated. The detection of the pattern of mouse jitter may have been previously performed by the request detector 210 (e.g., as part of performing operation 510). In example embodiments that include operation 636, the request that is being added to the challenge prompt requests submission of mouse input. The requested mouse input may be or include a reference set of mouse inputs (e.g., indicated by the reference user profile 240). In example embodiments that include operation 636, the generating of the indication in operation 550 is based on whether a reference pattern (e.g., indicated by the reference user profile 240) of mouse jitter is indicated by the second set of user inputs received in response to the generated challenge prompt.

According to various example embodiments, one or more of the methodologies described herein may facilitate detection of potential fraud and validation of user requests. Moreover, one or more of the methodologies described herein may facilitate dynamic intervention in a user's interaction with one or more server machines, dynamic generation or other provision of one or more challenge prompts, and determination of authenticity, verification, genuineness, or any suitable combination thereof, for one or more user requests. Hence, one or more of the methodologies described herein may facilitate anti-fraud activities, as well as user protection activities, compared to capabilities of pre-existing systems and methods.

When these effects are considered in aggregate, one or more of the methodologies described herein may obviate a need for certain efforts or resources that otherwise would be involved in detection of potential fraud and validation of user requests. Efforts expended by a user in protecting his or her activities online may be reduced by use of (e.g., reliance upon) a special-purpose machine that implements one or more of the methodologies described herein. Efforts expended by a system administrator in avoiding execution of fraudulent requests also may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 7:
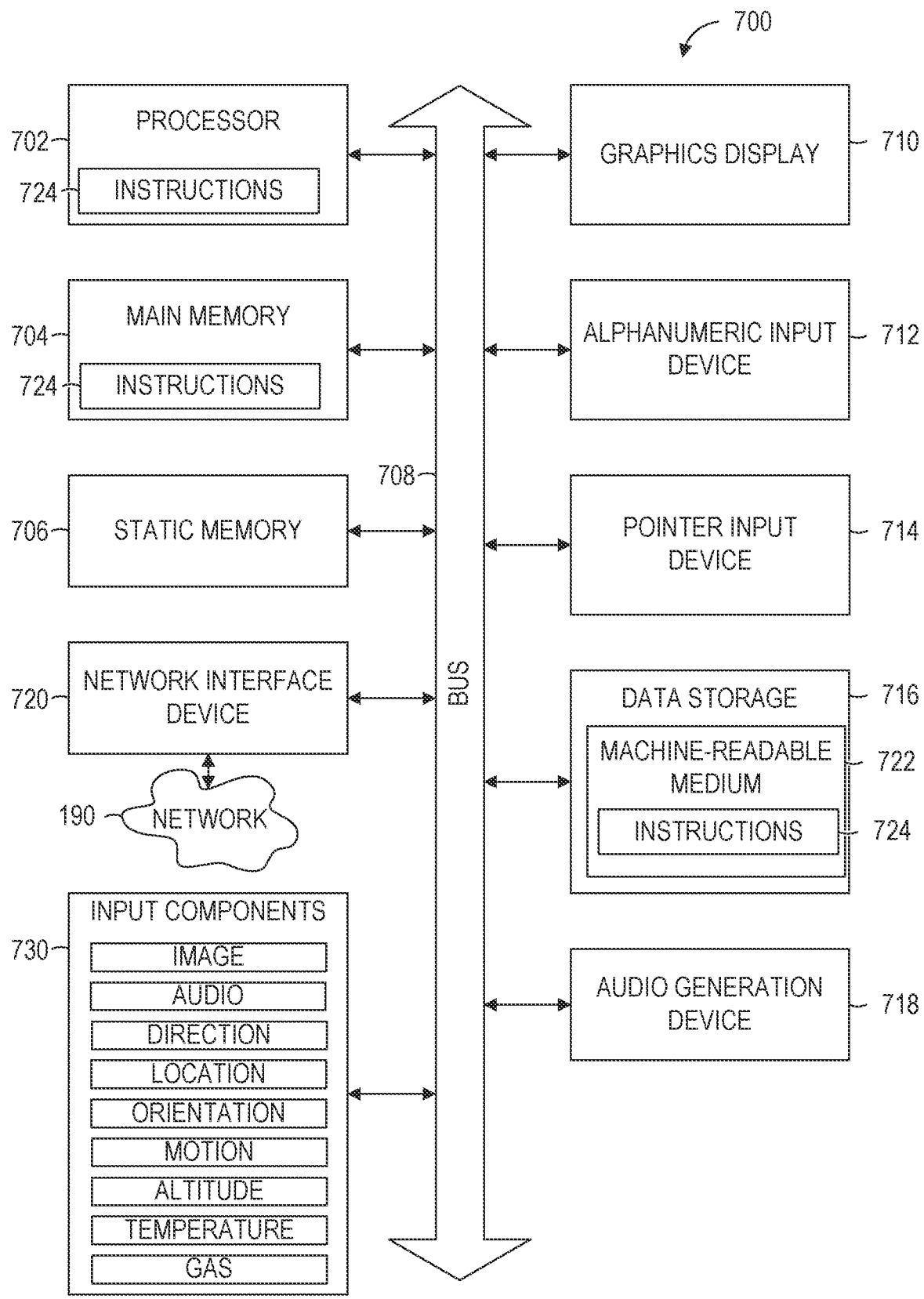
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read instructions 724 from a machine-readable medium 722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 7 shows the machine 700 in the example form of a computer system (e.g., a computer) within which the instructions 724 (e.g., software, a program, an application, an applet, an app, or other executable code) for causing the machine 700 to perform any one or more of the methodologies discussed herein may be executed, in whole or in part.

In alternative embodiments, the machine 700 operates as a standalone device or may be communicatively coupled (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include any collection of machines that individually or jointly execute the instructions 724 to perform all or part of any one or more of the methodologies discussed herein.

The machine 700 includes a processor 702 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 704, and a static memory 706, which are configured to communicate with each other via a bus 708. The processor 702 contains solid-state digital microcircuits (e.g., electronic, optical, or both) that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein. In some example embodiments, the processor 702 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 700 with at least the processor 702, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 700 may further include a graphics display 710 (e.g., a plasma display panel (PDP), a light emitting diode (LED) display, a liquid crystal display (LCD), a projector, a cathode ray tube (CRT), or any other display capable of displaying graphics or video). The machine 700 may also include an alphanumeric input device 712 (e.g., a keyboard or keypad), a pointer input device 714 (e.g., a mouse, a touchpad, a touchscreen, a trackball, a joystick, a stylus, a motion sensor, an eye tracking device, a data glove, or other pointing instrument), a data storage 716, an audio generation device 718 (e.g., a sound card, an amplifier, a speaker, a headphone jack, or any suitable combination thereof), and a network interface device 720.

The data storage 716 (e.g., a data storage device) includes the machine-readable medium 722 (e.g., a tangible and non-transitory machine-readable storage medium) on which are stored the instructions 724 embodying any one or more of the methodologies or functions described herein. The instructions 724 may also reside, completely or at least partially, within the main memory 704, within the static memory 706, within the processor 702 (e.g., within the processor's cache memory), or any suitable combination thereof, before or during execution thereof by the machine 700. Accordingly, the main memory 704, the static memory 706, and the processor 702 may be considered machine-readable media (e.g., tangible and non-transitory machine-readable media). The instructions 724 may be transmitted or received over the network 190 via the network interface device 720. For example, the network interface device 720 may communicate the instructions 724 using any one or more transfer protocols (e.g., hypertext transfer protocol (HTTP)).

In some example embodiments, the machine 700 may be a portable computing device (e.g., a smart phone, a tablet computer, or a wearable device) and may have one or more additional input components 730 (e.g., sensors or gauges). Examples of such input components 730 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 730 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 724 for execution by the machine 700, such that the instructions 724, when executed by one or more processors of the machine 700 (e.g., processor 702), cause the machine 700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 724 for execution by the machine 700 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 724).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems (e.g., machines, devices, or other apparatus) discussed herein. Any one or more features of an example, taken in isolation or combination, should be considered as being within the disclosure of this application.

A first example provides a method comprising:
detecting, by one or more processors, a request to execute a transaction specified by a first set of user inputs (e.g., via a user device operated by a user);
determining, by the one or more processors and based on the first set of user inputs that specified the transaction, that the request to execute the transaction is to be verified with a corresponding challenge prompt that is to be generated for the request to execute the transaction;
generating, by the one or more processors, the challenge prompt that corresponds to the request to execute the transaction specified by the first set of user inputs that specified the transaction;
causing, by the one or more processors, presentation of the generated challenge prompt that corresponds to the request to execute the transaction, a second set of user inputs being received in response to the presentation of the generated challenge prompt; and
generating, by the one or more processors, an indication of whether the request to execute the transaction specified by the first set of user inputs is verified based on the second set of user inputs received in response to the presentation of the generated challenge prompt that corresponds to the transaction specified by the first set of user inputs.

A second example provides a method according to the first example, wherein:
the determining that the request is to be verified with the challenge prompt includes: calculating a fraud likelihood score of the request based on the first set of user inputs; and
determining that the fraud likelihood score of the request is within a first range of fraud likelihood scores between a second range of fraud likelihood scores and a third range of fraud likelihood scores, the second range corresponding to presence of fraud and the third range corresponding to absence of fraud; and wherein:
the request is determined to be verified with the corresponding challenge prompt based on the fraud likelihood score being within the first range that is between the second range and the third range.

A third example provides a method according to the first example or the second example, wherein:
the determining that the request is to be verified with the challenge prompt includes:
determining that the first set of user inputs indicate coercion based on a comparison of the first set of user inputs to reference user inputs that indicate coercion; and wherein:
the generated challenge prompt includes user priming content configured to trigger behavior that indicates coercion; and
the generating of the indication of whether the request is verified is based on whether the behavior that indicates coercion is indicated by the second set of user inputs received in response to the generated challenge prompt.

A fourth example provides a method according to any of the first through third examples, wherein:
the determining that the request is to be verified with the challenge prompt includes:
determining that the first set of user inputs indicate coaching based on a comparison of the first set of user inputs to reference user inputs that indicate coaching; and wherein:
the generated challenge prompt includes user priming content configured to trigger behavior that indicates coaching; and
the generating of the indication of whether the request is verified is based on whether the behavior that indicates coaching is indicated by the second set of user inputs received in response to the generated challenge prompt.

A fifth example provides a method according to any of the first through fourth examples, wherein:
the first set of user inputs that specified the transaction includes a detected combination of dominant hand inputs and subordinate hand inputs that indicates a detected handedness of a user that submitted the first set of user inputs;
the generated challenge prompt requests submission of a reference combination of dominant hand inputs and subordinate hand inputs that indicates a reference handedness of the user; and
the generating of the indication of whether the request is verified is based on whether the reference combination of dominant hand inputs and subordinate hand inputs is included in the second set of user inputs received in response to the generated challenge prompt.

A sixth example provides a method according to any of the first through fifth examples, wherein:
the first set of user inputs that specified the transaction indicates a detected pattern of keyboard numeric inputs and keypad numeric inputs;
the generated challenge prompt requests submission of numeric inputs that indicate a reference pattern of keyboard numeric inputs and keypad numeric inputs; and
the generating of the indication of whether the request is verified is based on whether the reference pattern of keyboard numeric inputs and keypad numeric inputs is present in the second set of user inputs received in response to the generated challenge prompt.

A seventh example provides a method according to any of the first through sixth examples, wherein:
the first set of user inputs that specified the transaction indicates a detected completion time to perform a first task;
the generated challenge prompt requests performance of a reference task; and
the generating of the indication of whether the request is verified is based on whether a reference completion time to perform the reference task is indicated as being exceeded by the second set of user inputs received in response to the generated challenge prompt.

An eighth example provides a method according to any of the first through seventh examples, wherein:
the first set of user inputs that specified the transaction indicates a detected completion time to type a first text phrase;
the generated challenge prompt requests submission of a reference text phrase; and
the generating of the indication of whether the request is verified is based on whether a reference completion time to type the reference text phrase is indicated as being exceeded by the second set of user inputs received in response to the generated challenge prompt.

A ninth example provides a method according to any of the first through eighth examples, wherein:
the first set of user inputs that specified the transaction indicates a detected combination of typing cadence and typing error rate in typing a first text phrase;
the generated challenge prompt requests submission of a reference text phrase; and
the generating of the indication of whether the request is verified is based on whether a reference combination of typing cadence and typing error rate in typing the reference text phrase is indicated by the second set of user inputs received in response to the generated challenge prompt.

A tenth example provides a method according to any of the first through ninth examples, wherein:
the first set of user inputs that specified the transaction indicates a detected pattern of mouse jitter;
the generated challenge prompt requests submission of mouse input; and
the generating of the indication of whether the request is verified is based on whether a reference pattern of mouse jitter is indicated by the second set of user inputs received in response to the generated challenge prompt.

An eleventh example provides a method according to any of the first through tenth examples, wherein:
the determining that the request is to be verified with the challenge prompt includes detecting an open network port that corresponds to remote access software.

A twelfth example provides a method according to any of the first through eleventh examples, wherein:
the determining that the request is to be verified with the challenge prompt includes determining a geographical distance between a remote access device communicating with a client device that submitted the request to execute the transaction.

A thirteenth example provides a machine-readable medium (e.g., a non-transitory machine-readable storage medium) comprising instructions that, when executed by one or more processors of a machine, cause the machine to perform operations comprising:
detecting a request to execute a transaction specified by a first set of user inputs (e.g., via a user device operated by a user);
determining, based on the first set of user inputs that specified the transaction, that the request to execute the transaction is to be verified with a corresponding challenge prompt that is to be generated for the request to execute the transaction;
generating the challenge prompt that corresponds to the request to execute the transaction specified by the first set of user inputs that specified the transaction;
causing presentation of the generated challenge prompt that corresponds to the request to execute the transaction, a second set of user inputs being received in response to the presentation of the generated challenge prompt; and
generating an indication of whether the request to execute the transaction specified by the first set of user inputs is verified based on the second set of user inputs received in response to the presentation of the generated challenge prompt that corresponds to the transaction specified by the first set of user inputs.

A fourteenth example provides a machine-readable medium according to the thirteenth example, wherein:
the determining that the request is to be verified with the challenge prompt includes:
determining that the first set of user inputs indicate coercion based on a comparison of the first set of user inputs to reference user inputs that indicate coercion; and wherein:
the generated challenge prompt includes user priming content configured to trigger behavior that indicates coercion; and
the generating of the indication of whether the request is verified is based on whether the behavior that indicates coercion is indicated by the second set of user inputs received in response to the generated challenge prompt.

A fifteenth example provides a machine-readable medium according to the thirteenth example or the fourteenth example, wherein:
the first set of user inputs that specified the transaction indicates a detected pattern of keyboard numeric inputs and keypad numeric inputs;
the generated challenge prompt requests submission of numeric inputs that indicate a reference pattern of keyboard numeric inputs and keypad numeric inputs; and the generating of the indication of whether the request is verified is based on whether the reference pattern of keyboard numeric inputs and keypad numeric inputs is present in the second set of user inputs received in response to the generated challenge prompt.

A sixteenth example provides a machine-readable medium according to any of the thirteenth through fifteenth examples, wherein:
the first set of user inputs that specified the transaction indicates a detected completion time to perform a first task;
the generated challenge prompt requests performance of a reference task; and
the generating of the indication of whether the request is verified is based on whether a reference completion time to perform the reference task is indicated as being exceeded by the second set of user inputs received in response to the generated challenge prompt.

A seventeenth example provides a system (e.g., a computer system of one or more machines) comprising:
one or more processors; and
a memory storing instructions that, when executed by at least one processor among the one or more processors, cause the system to perform operations comprising:
detecting a request to execute a transaction specified by a first set of user inputs (e.g., via a user device operated by a user);
determining, based on the first set of user inputs that specified the transaction, that the request to execute the transaction is to be verified with a corresponding challenge prompt that is to be generated for the request to execute the transaction;
generating the challenge prompt that corresponds to the request to execute the transaction specified by the first set of user inputs that specified the transaction;
causing presentation of the generated challenge prompt that corresponds to the request to execute the transaction, a second set of user inputs being received in response to the presentation of the generated challenge prompt; and
generating an indication of whether the request to execute the transaction specified by the first set of user inputs is verified based on the second set of user inputs received in response to the presentation of the generated challenge prompt that corresponds to the transaction specified by the first set of user inputs.

An eighteenth example provides a system according to the seventeenth example, wherein:
the first set of user inputs that specified the transaction includes a detected combination of dominant hand inputs and subordinate hand inputs that indicates a detected handedness of a user that submitted the first set of user inputs;
the generated challenge prompt requests submission of a reference combination of dominant hand inputs and subordinate hand inputs that indicates a reference handedness of the user; and
the generating of the indication of whether the request is verified is based on whether the reference combination of dominant hand inputs and subordinate hand inputs is included in the second set of user inputs received in response to the generated challenge prompt.

A nineteenth example provides a system according to the seventeenth example or the eighteenth example, wherein:
the first set of user inputs that specified the transaction indicates a detected completion time to type a first text phrase;
the generated challenge prompt requests submission of a reference text phrase; and
the generating of the indication of whether the request is verified is based on whether a reference completion time to type the reference text phrase is indicated as being exceeded by the second set of user inputs received in response to the generated challenge prompt.

A twentieth example provides a system according to any of the seventeenth through nineteenth examples, wherein:
the first set of user inputs that specified the transaction indicates a detected pattern of mouse jitter;
the generated challenge prompt requests submission of mouse input; and
the generating of the indication of whether the request is verified is based on whether a reference pattern of mouse jitter is indicated by the second set of user inputs received in response to the generated challenge prompt.

A twenty-first example provides a carrier medium carrying machine-readable instructions for controlling a machine to carry out the operations (e.g., method operations) performed in any one of the previously described examples.

What is claimed is:
1. A method comprising:
detecting, by one or more processors, a request to execute a transaction specified by a first set of user inputs;
determining, by the one or more processors and based on the first set of user inputs that specified the transaction, that the request to execute the transaction is to be verified with a corresponding challenge prompt, the determining including:
calculating a fraud likelihood score of the request based on the first set of user inputs that specified the transaction; and
determining that the fraud likelihood score of the request is within a first range of fraud likelihood scores between a second range of fraud likelihood scores and a third range of fraud likelihood scores, the second range corresponding to presence of fraud and the third range corresponding to absence of fraud;
generating, by the one or more processors, the corresponding challenge prompt to verify the request to execute the transaction;
causing, by the one or more processors, presentation of the corresponding challenge prompt, a second set of user inputs being received in response to the presentation of the corresponding challenge prompt; and
generating, by the one or more processors, an indication of whether the request to execute the transaction is verified based on the second set of user inputs received in response to the presentation of the generated corresponding challenge prompt.
2. The method of claim 1, wherein:
the determining that the request is to be verified with the challenge prompt includes:
determining that the first set of user inputs indicate coercion based on a comparison of the first set of user inputs to reference user inputs that indicate coercion; and wherein:
the generated corresponding challenge prompt includes user priming content configured to trigger behavior that indicates coercion; and
the generating of the indication of whether the request is verified is based on whether the behavior that indicates coercion is indicated by the second set of user inputs received in response to the generated corresponding challenge prompt.

3. The method of claim 1, wherein:
the determining that the request is to be verified with the challenge prompt includes:
  determining that the first set of user inputs indicate coaching based on a comparison of the first set of user inputs to reference user inputs that indicate coaching; and wherein:
the generated corresponding challenge prompt includes user priming content configured to trigger behavior that indicates coaching; and
the generating of the indication of whether the request is verified is based on whether the behavior that indicates coaching is indicated by the second set of user inputs received in response to the generated corresponding challenge prompt.

4. The method of claim 1, wherein:
the first set of user inputs that specified the transaction includes a detected combination of dominant hand inputs and subordinate hand inputs that indicates a detected handedness of a user that submitted the first set of user inputs;
the generated corresponding challenge prompt requests submission of a reference combination of dominant hand inputs and subordinate hand inputs that indicates a reference handedness of the user; and
the generating of the indication of whether the request is verified is based on whether the reference combination of dominant hand inputs and subordinate hand inputs is included in the second set of user inputs received in response to the generated corresponding challenge prompt.

5. The method of claim 1, wherein:
the first set of user inputs that specified the transaction indicates a detected pattern of keyboard numeric inputs and keypad numeric inputs;
the generated corresponding challenge prompt requests submission of numeric inputs that indicate a reference pattern of keyboard numeric inputs and keypad numeric inputs; and
the generating of the indication of whether the request is verified is based on whether the reference pattern of keyboard numeric inputs and keypad numeric inputs is present in the second set of user inputs received in response to the generated corresponding challenge prompt.

6. The method of claim 1, wherein:
the first set of user inputs that specified the transaction indicates a detected completion time to perform a first task;
the generated corresponding challenge prompt requests performance of a reference task; and
the generating of the indication of whether the request is verified is based on whether a reference completion time to perform the reference task is indicated as being exceeded by the second set of user inputs received in response to the generated corresponding challenge prompt.

7. The method of claim 1, wherein:
the first set of user inputs that specified the transaction indicates a detected completion time to type a first text phrase;
the generated corresponding challenge prompt requests submission of a reference text phrase; and
the generating of the indication of whether the request is verified is based on whether a reference completion time to type the reference text phrase is indicated as being exceeded by the second set of user inputs received in response to the generated corresponding challenge prompt.

8. The method of claim 1, wherein:
the first set of user inputs that specified the transaction indicates a detected combination of typing cadence and typing error rate in typing a first text phrase;
the generated corresponding challenge prompt requests submission of a reference text phrase; and
the generating of the indication of whether the request is verified is based on whether a reference combination of typing cadence and typing error rate in typing the reference text phrase is indicated by the second set of user inputs received in response to the generated corresponding challenge prompt.

9. The method of claim 1, wherein:
the first set of user inputs that specified the transaction indicates a detected pattern of mouse jitter;
the generated corresponding challenge prompt requests submission of mouse input; and
the generating of the indication of whether the request is verified is based on whether a reference pattern of mouse jitter is indicated by the second set of user inputs received in response to the generated corresponding challenge prompt.

10. The method of claim 1, wherein:
the determining that the request is to be verified with the challenge prompt includes detecting an open network port that corresponds to remote access software.

11. The method of claim 1, wherein:
the determining that the request is to be verified with the challenge prompt includes determining a geographical distance between a remote access device communicating with a client device that submitted the request to execute the transaction.

12. A non-transitory machine-readable storage medium comprising instructions that, when executed by one or more processors of a machine, cause the machine to perform operations comprising:
  detecting a request to execute a transaction specified by a first set of user inputs;
  determining, based on the first set of user inputs that specified the transaction, that the request to execute the transaction is to be verified with a corresponding challenge prompt, the determining including:
    calculating a fraud likelihood score of the request based on the first set of user inputs that specified the transaction; and
    determining that the fraud likelihood score of the request is within a first range of fraud likelihood scores between a second range of fraud likelihood scores and a third range of fraud likelihood scores, the second range corresponding to presence of fraud and the third range corresponding to absence of fraud;
  generating, by the one or more processors, the corresponding challenge prompt to verify the transaction;
  causing presentation of the corresponding challenge prompt, a second set of user inputs being received in response to the presentation of the corresponding challenge prompt; and
  generating an indication of whether the request to execute the transaction is verified based on the second set of user inputs.

13. The non-transitory machine-readable storage medium of claim 12, wherein:
the determining that the request is to be verified with the challenge prompt includes:
determining that the first set of user inputs indicate coercion based on a comparison of the first set of user inputs to reference user inputs that indicate coercion; and wherein:
the generated corresponding challenge prompt includes user priming content configured to trigger behavior that indicates coercion; and
the generating of the indication of whether the request is verified is based on whether the behavior that indicates coercion is indicated by the second set of user inputs received in response to the generated corresponding challenge prompt.

14. The non-transitory machine-readable storage medium of claim 12, wherein:
the first set of user inputs that specified the transaction indicates a detected pattern of keyboard numeric inputs and keypad numeric inputs;
the generated corresponding challenge prompt requests submission of numeric inputs that indicate a reference pattern of keyboard numeric inputs and keypad numeric inputs; and
the generating of the indication of whether the request is verified is based on whether the reference pattern of keyboard numeric inputs and keypad numeric inputs is present in the second set of user inputs received in response to the generated corresponding challenge prompt.

15. The non-transitory machine-readable storage medium of claim 12, wherein:
the first set of user inputs that specified the transaction indicates a detected completion time to perform a first task;
the generated corresponding challenge prompt requests performance of a reference task; and
the generating of the indication of whether the request is verified is based on whether a reference completion time to perform the reference task is indicated as being exceeded by the second set of user inputs received in response to the generated corresponding challenge prompt.

16. A system comprising:
one or more processors; and
a memory storing instructions that, when executed by at least one processor among the one or more processors, cause the system to perform operations comprising:
detecting a request to execute a transaction specified by a first set of user inputs;
determining, based on the first set of user inputs that specified the transaction, that the request to execute the transaction is to be verified with a corresponding challenge prompt the determining including:
calculating a fraud likelihood score of the request based on the first set of user inputs that specified the transaction; and
determining that the fraud likelihood score of the request is within a first range of fraud likelihood scores between a second range of fraud likelihood scores and a third range of fraud likelihood scores, the second range corresponding to presence of fraud and the third range corresponding to absence of fraud;
generating, by the one or more processors, the corresponding challenge prompt to verify the transaction;
causing presentation of the corresponding challenge prompt, a second set of user inputs being received in response to the presentation of the corresponding challenge prompt; and
generating an indication of whether the request to execute the transaction is verified based on the second set of user inputs.

17. The system of claim 16, wherein:
the first set of user inputs that specified the transaction includes a detected combination of dominant hand inputs and subordinate hand inputs that indicates a detected handedness of a user that submitted the first set of user inputs;
the generated corresponding challenge prompt requests submission of a reference combination of dominant hand inputs and subordinate hand inputs that indicates a reference handedness of the user; and
the generating of the indication of whether the request is verified is based on whether the reference combination of dominant hand inputs and subordinate hand inputs is included in the second set of user inputs received in response to the generated corresponding challenge prompt.

18. The system of claim 16, wherein:
the first set of user inputs that specified the transaction indicates a detected completion time to type a first text phrase;
the generated corresponding challenge prompt requests submission of a reference text phrase; and
the generating of the indication of whether the request is verified is based on whether a reference completion time to type the reference text phrase is indicated as being exceeded by the second set of user inputs received in response to the generated corresponding challenge prompt.

19. The system of claim 16, wherein:
the first set of user inputs that specified the transaction indicates a detected pattern of mouse jitter;
the generated corresponding challenge prompt requests submission of mouse input; and
the generating of the indication of whether the request is verified is based on whether a reference pattern of mouse jitter is indicated by the second set of user inputs received in response to the generated corresponding challenge prompt.

* * * * *